(12) United States Patent
Krimbacher

(10) Patent No.: US 8,480,378 B2
(45) Date of Patent: Jul. 9, 2013

(54) METHOD AND DEVICE FOR CONTROLLING A HYDRAULIC DRIVE SYSTEM

(75) Inventor: Norbert Krimbacher, Satteins (AT)

(73) Assignee: Liebherr-Werk Nenzing GmbH, Nenzing (AT)

(*) Notice: Subject to any disclaimer, the term of this patent is extended or adjusted under 35 U.S.C. 154(b) by 957 days.

(21) Appl. No.: 11/711,347

(22) Filed: Feb. 27, 2007

(65) Prior Publication Data

US 2008/0003113 A1 Jan. 3, 2008

(30) Foreign Application Priority Data

Feb. 27, 2006 (DE) .................. 10 2006 009 063

(51) Int. Cl.
*F04B 19/00* (2006.01)
*F04B 49/00* (2006.01)

(52) U.S. Cl.
USPC ..................... 417/213; 417/212; 417/282

(58) Field of Classification Search
USPC ................. 417/282, 212, 213; 60/449, 327, 60/445
See application file for complete search history.

(56) References Cited

U.S. PATENT DOCUMENTS

| | | | | |
|---|---|---|---|---|
| 3,757,525 A * | 9/1973 | Rusch et al. | ..... | 60/492 |
| 5,488,787 A * | 2/1996 | Aoyagi et al. | ..... | 37/348 |
| 5,531,304 A * | 7/1996 | Ishino et al. | ..... | 192/221 |
| 5,540,554 A * | 7/1996 | Masuzawa | ..... | 417/20 |
| 5,638,677 A * | 6/1997 | Hosono et al. | ..... | 60/431 |
| 6,282,892 B1 * | 9/2001 | Arai | ..... | 60/450 |
| 6,684,636 B2 * | 2/2004 | Smith | ..... | 60/449 |
| 7,069,673 B2 * | 7/2006 | Kagoshima et al. | ..... | 37/348 |
| 2005/0071067 A1 * | 3/2005 | Guven et al. | ..... | 701/54 |
| 2006/0018765 A1 * | 1/2006 | Fransson et al. | ..... | 417/213 |

FOREIGN PATENT DOCUMENTS

| | | |
|---|---|---|
| DE | 3823283 | 1/1989 |
| DE | 4226 453 | 2/1994 |
| DE | 4229950 | 3/1994 |
| DE | 4327313 | 2/1995 |
| DE | 4425130 | 2/1995 |
| DE | 4440304 | 7/1995 |
| DE | 19538649 | 4/1997 |
| DE | 19644961 | 4/1998 |
| DE | 10040203 | 3/2001 |
| DE | 10006977 | 9/2001 |
| DE | 19680008 | 1/2002 |
| DE | 69727659 | 10/2004 |
| EP | 0497293 | 8/1992 |
| EP | 00695875 | 2/1996 |
| EP | 1002 685 | 5/2000 |
| EP | 1154162 | 11/2001 |
| EP | 1162374 | 12/2001 |

* cited by examiner

*Primary Examiner* — Charles Freay
*Assistant Examiner* — Alexander Comley
(74) *Attorney, Agent, or Firm* — Dilworth & Barrese, LLP.

(57) ABSTRACT

In a method and device for controlling a hydraulic drive system, in particular in a crane or construction machine, a closed hydraulic circuit has a hydraulic pump and motor in which depending upon a desired value ($n_{des}$) of an output parameter of the hydraulic circuit, an actuating signal (I) is generated for adjusting the hydraulic pump and/or motor. The actuating signal (I) is limited and/or reduced by a superordinate control module (6) depending on matching of a specified power value ($P_+$; $P_-$) with a current power value ($P_{Pu}$; $P_M$) of the hydraulic pump and/or motor.

18 Claims, 1 Drawing Sheet

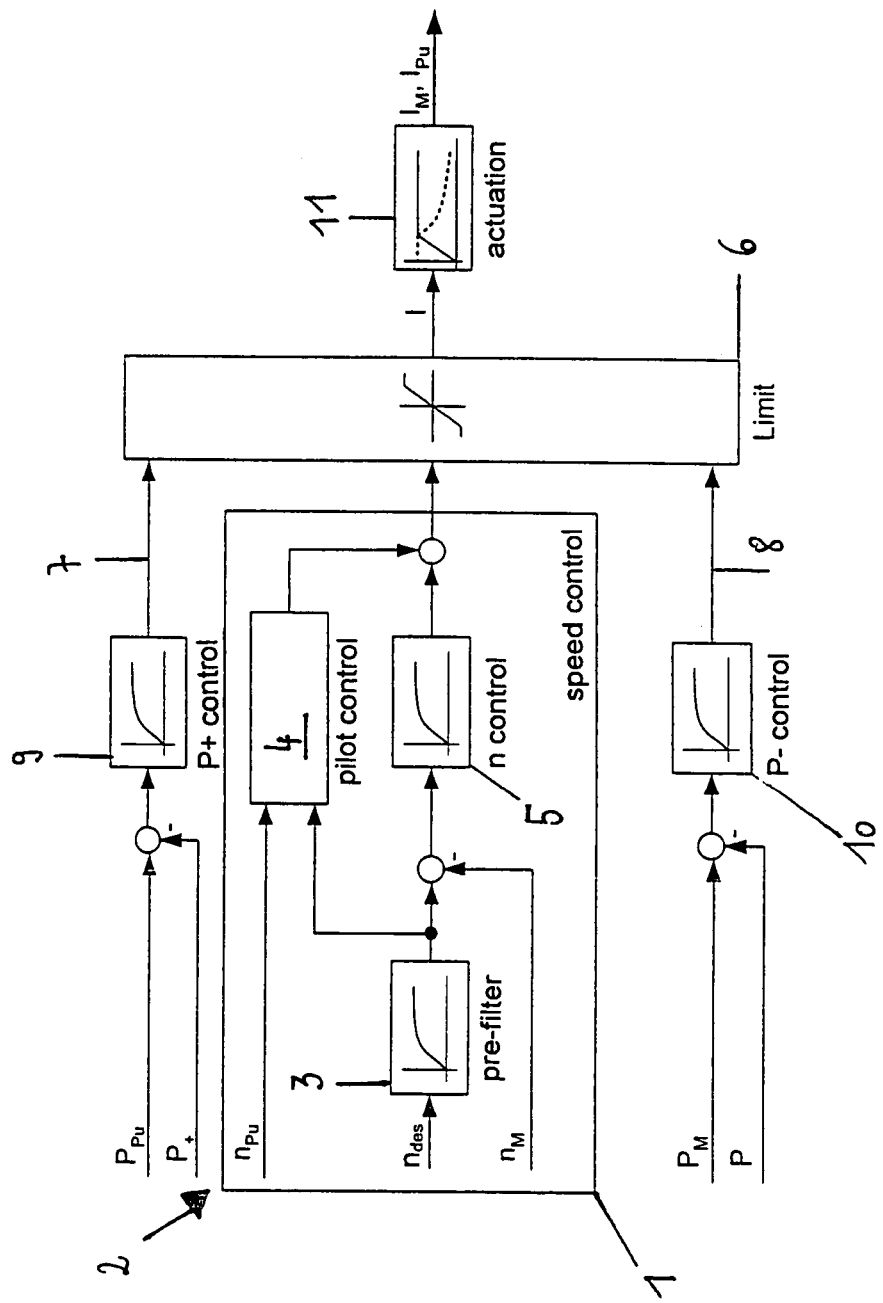

METHOD AND DEVICE FOR CONTROLLING A HYDRAULIC DRIVE SYSTEM

BACKGROUND OF THE INVENTION

The present invention relates to a method for controlling a hydraulic drive system, in particular of a crane or a construction machine, which comprises a closed hydraulic circuit with a hydraulic pump and a hydraulic motor, in which in dependence on a desired value of an output parameter of the hydraulic circuit an actuating signal is provided for adjusting the hydraulic pump and/or the hydraulic motor. The invention furthermore relates to a device for controlling such hydraulic drive system which comprises a closed hydraulic circuit with a hydraulic pump and a hydraulic motor, comprising an actuating signal circuit for generating an actuating signal for the hydraulic pump and/or the hydraulic motor in dependence on a desired value of an output parameter of the hydraulic circuit. The invention finally relates to a crane and/or some other construction machine with a hydraulic drive system which comprises a closed hydraulic circuit with a hydraulic pump and a hydraulic motor, and to a control device for controlling the hydraulic drive system with an actuating signal circuit for generating an actuating signal for the hydraulic pump and/or the hydraulic motor in dependence on an output parameter of the hydraulic circuit.

Cranes, but also other construction machines, regularly have hydraulic drive systems with at least one closed hydraulic circuit, which has a hydraulic pump in combination with a hydraulic motor. By means of such hydraulic drive systems, various drive functions are realized for instance on cranes, and in particular hoisting winch drives, chain drives or wheel drives can be realized in this way. The hydraulic pump regularly is driven via a drive unit, such as an internal combustion engine. The hydraulic stream generated by the pump is translated into the corresponding actuating movement by the hydraulic motor coupled therewith. In order to control the corresponding actuating movement in a precise and stable way, the speed of the hydraulic motor must be controlled accordingly, the delivery rate of the hydraulic pump and the absorption volume of the hydraulic motor being adjustable, for instance by using adjustable types of swash plate for these components, but other types can be used as well. On the one hand, a fast response of the system should be achieved with corresponding operating or control commands. On the other hand, operating the actuators too fast or overriding the same can lead to instabilities of the drive system. Increasing the delivery rate of the hydraulic pump and/or the absorption volume of the hydraulic motor too fast can lead for instance to a strong deceleration of the drive unit or even a stalling of the diesel engine. Increasing the output torque too fast, for instance, can also lead to individual drive wheels spinning, when the system is used as a wheel drive and the vehicle moves for instance on a gravel road.

SUMMARY OF THE INVENTION

It is the object underlying the present invention to create an improved method and a device for controlling such hydraulic drive system as mentioned above, which avoid the disadvantages of the prior art and develop the same in an advantageous way. Preferably, a stable control of the hydraulic drive system should be achieved, which can take into account various marginal conditions for power transmission or output force.

In accordance with the invention, this object is solved by a method, device and crane or construction machine as described herein. Preferred aspects of the invention are also described herein.

Thus, a control is proposed, whose principle is based on the fact that the actuating signals, which are determined for the individual hydraulic components on the basis of the desired output parameters, are limited or reduced by checking power specifications, which can be specified externally or internally, to thereby ensure the stability of the system. The actuating signals generated are limited or reduced such that the power produced by the hydraulic system and/or the power recirculated to the hydraulic system does not exceed the power specifications. In accordance with the invention, the actuating signal is limited and/or reduced by a superordinate control module in dependence on a matching of a specified power value with a current power value of the hydraulic pump and/or the hydraulic motor. Thereby, too fast and/or too large actuating movements of the actuators of the hydraulic components can be prevented, which would lead to instabilities of the drive system and/or to undesired output parameters.

Advantageously, the respectively specified power value and the respective current power value are supplied to a controller, which provides a superordinate control signal, in dependence on which the actuating signal for the actuators of the hydraulic components is reduced and/or limited.

In accordance with a development of the invention, various power values can be specified, with which the respective current power value is matched. For power matching, the specified power value advantageously can be determined in dependence on a maximum available power of a drive unit driving the hydraulic circuit and/or of the entire drive system. Thereby, it is ensured that the actuators of the hydraulic circuit components are not run into operating ranges which would lead to instabilities of the entire drive system. In particular, it is prevented thereby that for the hydraulic pump a delivery rate and/or for the hydraulic motor an absorption volume is adjusted which would lead to a stalling of the drive unit. The power currently output at the hydraulic drive is not increased beyond the power to be provided maximally by the drive.

Alternatively or in addition, the specified power value can be determined in dependence on an operating mode of the drive system or of the crane or construction machine in which the drive system is used. In particular, power specifications can be satisfied by method-related functional restrictions, such as a maximum power supply in special operating situations.

Alternatively or in addition, the specified power value can be obtained from a power balance of all drive groups connected in the drive system. By preparing a power balance for the complete machine, a corresponding power distribution can be realized within the machine, so that from the finally available drive power corresponding proportions are obtained for the respective control circuit or hydraulic circuit.

According to an advantageous development of the invention, the power limit furthermore can be calculated by restricting the maximum transmittable power of the closed hydraulic circuit at the current speed, the maximum transmittable power preferably being determined on the basis of a restriction of pressure in the closed hydraulic circuit. By means of sensors or mathematical models, which imitate the hydraulic units, the volume flow rate of the components can be measured or estimated, so that by means of this volume flow rate and the corresponding limit values for pressure levels an internal power limit can then be calculated, which is used to effect a power matching for reducing or limiting the actuating signal. In particular, the specified power value can be determined in dependence on a current speed of the hydraulic pump and/or the hydraulic motor and in dependence on a pressure limit value of the hydraulic circuit.

In accordance with a development of the invention, there is always used the smallest one of the various possible power limits influencing the control circuit. The limitation or reduction of the actuating signal provided takes the smallest power specification for orientation.

In accordance with an advantageous embodiment of the invention, the actuating signals for the hydraulic components of the hydraulic circuit are limited or reduced both in dependence on a specified power value for the power provided by the system and in dependence on a specified power value for the power recirculated to the system. In particular, the actuating signal can be limited and/or reduced on the one hand in dependence on a matching of the current pump power value with a specified maximum power value for the power to be provided and on the other hand in dependence on a matching of the current motor power value with a specified maximum power value for the power to be recirculated. Thereby, it can be ensured on the one hand that the power provided by the hydraulic circuit does not overshoot the mark, while it is achieved on the other hand that the braking torque provided by the hydraulic circuit is in conformity with the power specifications provided therefor.

In principle, the actuating signals for the hydraulic components can be determined in dependence on various output parameters. In accordance with a development of the invention, the speed of the hydraulic motor can in particular be the output parameter in dependence on which the actuating signals are provided.

Advantageously, the actuating signal is generated in dependence on the signal of a controller to which the desired value and the actual value of said operating parameter are supplied. In the case of the speed of the hydraulic motor, the actuating signal thus is generated by a speed controller and is then limited or reduced in the prescribed way.

In accordance with an advantageous development of the invention, the actuating signal can also be generated in dependence on a pilot control signal which is determined in dependence on the desired value of said output parameter and an actual value of an operating parameter of the hydraulic pump and/or the hydraulic motor. In particular, the pilot control can take into account the actual speed of the hydraulic pump. With a specified actual speed of the hydraulic pump on the one hand and a predetermined desired speed of the hydraulic motor on the other hand, the hydraulic circuit can be adjusted therefrom to a specific transmission ratio, which can be achieved via specific actuating signals.

Advantageously, the actuating signal circuit on the one hand comprises said pilot control and on the other hand the control mentioned above, so that the actuating signal is roughly specified via the pilot control, so to speak, and fine deviations can be compensated by means of the controller.

In accordance with a development of the invention, there is first provided a dimensionless actuating signal, which then is limited or reduced in dependence on the matching of the respectively specified power value with the associated current power value of the hydraulic circuit, and finally is supplied to the respective actuator of the hydraulic circuit by a driving stage.

BRIEF DESCRIPTION OF THE DRAWING

The invention will subsequently be explained in detail with reference to a preferred embodiment and associated drawings, in which:

FIG. 1: shows a schematic representation of the control circuit for actuating the hydraulic pump and the hydraulic motor of a closed hydraulic circuit, which preferably is used for a non-illustrated crane or a similar construction machine and can be used for controlling a hoisting winch drive, a chain drive or a wheel drive system of such a crane.

DESCRIPTION OF THE PREFERRED EMBODIMENTS

The control circuit portion 1 of the control device 2 as shown in FIG. 1 serves to generate a dimensionless actuating signal I and constitutes a speed control in the illustrated embodiment. A desired speed $n_{des}$ of the hydraulic motor, which can be determined in dependence on various marginal conditions, first is passed through a pre-filter 3 and together with the actual speed $n_{Pu}$ of the hydraulic pump is supplied to a pilot control module 4, which calculates a dimensionless actuating signal I by using the known variables of the closed hydraulic circuit including pump size, motor size and speed or speed ratios. On the other hand, the filtered signal $n_{des}$, which represents the desired speed of the hydraulic motor, is supplied to a speed controller 5 together with the actual speed $n_M$ of the hydraulic motor, in order to compensate corresponding deviations between the actuating signal and the speed achieved. From said pilot control together with the speed control, said dimensionless actuating signal I is generated.

This dimensionless actuating signal I is limited or reduced in a control module 6, namely in dependence on superordinate control signals 7 and 8 which come from corresponding superordinate power controllers 9 and 10.

The current power $P_{Pu}$ supplied to the hydraulic circuit on the one hand and the specified power value $P_+$ on the other hand are supplied to the superordinate power controller 9 and are matched with each other by the controller 9. The specified power value $P_+$ can be determined as described above and can be defined for instance as the maximum available power of the drive unit. If the current power value $P_{Pu}$ exceeds the specified power value $P_+$, the control module 6 correspondingly reduces the generated dimensionless actuating signal I, to prevent the actuators of the hydraulic pump and of the hydraulic motor from being run into operating ranges which would make the current power $P_{PU}$ greater than the specified power $P_+$.

Laterally reversed, so to speak, the power $P_M$ each currently recirculated at the hydraulic motor is matched with a correspondingly specified power value $P_-$, which likewise can be determined in various ways as described above and can be defined for instance as the maximum braking torque which the hydraulic motor should not exceed.

The reverse power specifications can be determined from marginal process conditions, from the maximum possible power supply to the drive unit and/or by using measurements or estimates and corresponding limit values for pressure levels in the hydraulic system.

The invention claimed is:

1. A method for controlling a hydraulic drive system, which comprises a closed hydraulic circuit with a hydraulic pump and a hydraulic motor, comprising:
    providing by a control circuit in dependence on a desired speed of the hydraulic motor ($n_{des}$) an actuating signal (I) for adjusting at least one of the hydraulic pump and the hydraulic motor; and
    at least one of limiting and reducing by a superordinate control module (6) the actuating signal (I) in dependence on a matching of a specified power value of the hydraulic pump ($P_+$) with a current power value of the hydraulic pump ($P_{Pu}$) and a specified power value of the hydraulic motor ($P_-$) with a current power value of the hydraulic motor($P_M$), wherein the specified power value of the hydraulic pump is a maximum specified output power of the hydraulic pump, the current power value of the hydraulic pump is a current output power supplied by the hydraulic pump, the specified power value of the hydraulic motor is a maximum specified output power of the hydraulic motor recirculated to the hydraulic pump, and the current power value of the hydraulic motor is a current output power of the hydraulic motor recirculated to the hydraulic pump, such that the power provided by the hydraulic pump does not exceed the maximum specified output power of the hydraulic pump and that a braking torque provided by the hydraulic motor is less than the maximum specified output power of the hydraulic motor, and wherein the actuating signal (I) is at least one of limited and reduced on the one hand in dependence on a matching of a current pump power value ($P_{Pu}$) with a specified maximum power value for the power to be provided and on the other hand in dependence on a matching of a current motor power value ($P_M$) with a specified maximum power value for the power to be recirculated.

2. The method as claimed in claim 1, wherein the specified power value ($P_+$; $P_-$) and the current power value ($P_{Pu}$; $P_M$) are supplied to a controller (9; 10) which provides a superordinate control signal (7; 8), in dependence on which the actuating signal (I) is at least one of reduced and limited.

3. The method as claimed in claim 1, wherein the specified power value ($P_+$; $P_-$) is determined in dependence on at least one of an operating mode and an operating situation.

4. The method as claimed in claim 1, wherein the specified power value ($P_+$; $P_-$) is determined in dependence on a maximum available power of at least one of the drive system and of a drive unit driving the hydraulic circuit.

5. The method as claimed in claim 1, wherein the specified power value ($P_+$; $P_-$) is determined in dependence on a power balance of all drive groups connected in the drive system.

6. The method as claimed in claim 1, wherein the specified power value ($P_+$; $P_-$) is determined in dependence on a current speed ($n_{Pu}$; $n_M$) of at least one of the hydraulic pump and the hydraulic motor and on a pressure limit value of the hydraulic circuit.

7. The method as claimed in claim 1, wherein the actuating signal (I) is provided in dependence on the signal of a controller (5) to which the desired speed of the hydraulic motor and the actual speed of the hydraulic motor ($n_{des}$, $n_M$) are supplied.

8. The method as claimed in claim 1, wherein the actuating signal (I) is provided in dependence on a pilot control signal which is determined in dependence on the desired speed of the hydraulic motor ($n_{des}$) of said output parameter and on an actual speed of at least one of the hydraulic pump and the hydraulic motor ($n_{Pu}$; $n_M$).

9. The method as claimed in claim 1, wherein the actuating signal (I) first is provided dimensionless, then is at least one of limited and reduced in dependence on the matching of the specified power value ($P_+$; $P_-$) with the respective current power value ($P_{Pu}$; $P_M$), and then is supplied to the respective actuator of the closed hydraulic circuit by a driving stage (11).

10. The method as claimed in claim 9, wherein the driving stage (11) provides an actuating signal ($I_M$) for the hydraulic motor and an actuating signal ($I_{Pu}$) for the hydraulic pump.

11. A control device for controlling a hydraulic drive system, which comprises a closed hydraulic circuit with a hydraulic pump and a hydraulic motor, comprising a control signal circuit (1) for providing an actuating signal for adjusting at least one of the hydraulic pump and the hydraulic motor in dependence on a desired speed of the hydraulic motor, and comprising a superordinate control circuit (6, 9, 10) for at least one of limiting and reducing the actuating signal in dependence on a matching of a specified power value of the hydraulic pump ($P_+$) with a current power value of the hydraulic pump ($P_{Pu}$) and a specified power value of the hydraulic motor ($P_-$) with a current power value of the hydraulic motor ($P_M$), wherein the specified power value of the hydraulic pump is a maximum specified output power of the hydraulic pump, the current power value of the hydraulic pump is a current output power supplied by the hydraulic pump, the specified power value of the hydraulic motor is a maximum specified output power of the hydraulic motor recirculated to the hydraulic pump, and the current power value of the hydraulic motor is a current output power of the hydraulic motor recirculated to the hydraulic pump, such that the power provided by the hydraulic pump does not exceed the maximum specified output power of the hydraulic pump and that a braking torque provided by the hydraulic motor is less than the maximum specified output power of the hydraulic motor, and wherein the actuating signal is at least one of limited and reduced on the one hand in dependence on a matching of a current pump power value ($P_{Pu}$) with a specified maximum power value for the power to be provided and on the other hand in dependence on a matching of a current motor power value ($P_M$) with a specified maximum power value for the power to be recirculated.

12. A construction machine with a hydraulic drive system which comprises a closed hydraulic circuit with a hydraulic pump and a hydraulic motor, as well as a control device (2) for controlling the hydraulic drive system, the control device having an actuating signal circuit (1) for providing an actuating signal for adjusting at least one of the hydraulic pump and the hydraulic motor in dependence on a desired speed of the hydraulic motor, and comprising a superordinate control circuit (6, 9, 10) for at least one of limiting and reducing the actuating signal in dependence on a matching of a specified power value of the hydraulic pump ($P^+$) with a current power value of the hydraulic pump ($P_{Pu}$) and a specified power value of the hydraulic motor ($P_-$) with a current power value of the hydraulic motor ($P_M$), wherein the specified power value of the hydraulic pump is a maximum specified output power of the hydraulic pump, the current power value of the hydraulic pump is a current output power supplied by the hydraulic pump, the specified power value of the hydraulic motor is a maximum specified output power of the hydraulic motor recirculated to the hydraulic pump, and the current power value of the hydraulic motor is a current output power of the hydraulic motor recirculated to the hydraulic pump, such that the power provided by the hydraulic pump does not exceed the maximum specified output power of the hydraulic pump and that a braking torque provided by the hydraulic motor is less than the maximum specified output power of the hydraulic motor, and wherein the actuating signal is at least one of limited and reduced on the one hand in dependence on a matching of a current pump power value ($P_{Pu}$) with a specified maximum power value for the power to be provided and on the other hand in dependence on a matching of a current motor power value ($P_M$) with a specified maximum power value for the power to be recirculated.

13. The method as claimed in claim 2, wherein the specified power value ($P_+$; $P_-$) is determined in dependence on at least one of an operating mode and an operating situation.

14. The method as claimed in claim 13, wherein the specified power value ($P_+$; $P_-$) is determined in dependence on a maximum available power of at least one of the drive system and of a drive unit driving the hydraulic circuit.

15. The method as claimed in claim 14, wherein the specified power value ($P_+$; $P_-$) is determined in dependence on a power balance of all drive groups connected in the drive system.

16. The method as claimed in claim 15, wherein the specified power value ($P_+$; $P_-$) is determined in dependence on a current speed ($n_{Pu}$; $n_M$) of at least one of the hydraulic pump and the hydraulic motor and on a pressure limit value of the hydraulic circuit.

17. The method as claimed in claim 1, wherein the hydraulic drive system is included in a crane or a construction machine.

18. The method as claimed in claim 11, wherein the hydraulic drive system is included in a crane or a construction machine.

\* \* \* \* \*